United States Patent
Roh

(10) Patent No.: US 8,725,200 B2
(45) Date of Patent: May 13, 2014

(54) COMMUNICATION OPERATING METHOD FOR DUAL STANDBY MOBILE TERMINAL AND DUAL STANDBY MOBILE TERMINAL SUPPORTING THE SAME

(75) Inventor: Yang Woon Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 13/290,597

(22) Filed: Nov. 7, 2011

(65) Prior Publication Data

US 2012/0149419 A1    Jun. 14, 2012

(30) Foreign Application Priority Data

Dec. 10, 2010    (KR) .................. 10-2010-0126141

(51) Int. Cl.
*H04W 88/06* (2009.01)

(52) U.S. Cl.
USPC ............... 455/552.1; 455/551; 455/67.11; 455/515

(58) Field of Classification Search
USPC ............ 455/552.1, 551, 550.1, 556.3, 67.11, 455/90.2, 515, 517, 434; 370/331, 332, 329
See application file for complete search history.

(56) References Cited

U.S. PATENT DOCUMENTS

| | | | | |
|---|---|---|---|---|
| 6,108,543 | A * | 8/2000 | Takahashi et al. | 455/434 |
| 7,869,806 | B2 * | 1/2011 | Lim | 455/434 |
| 8,185,157 | B2 * | 5/2012 | Shi | 455/558 |
| 8,320,975 | B2 * | 11/2012 | Song | 455/574 |
| 2011/0117963 | A1 * | 5/2011 | Wang et al. | 455/558 |

* cited by examiner

*Primary Examiner* — John J Lee
(74) *Attorney, Agent, or Firm* — Jefferson IP Law, LLP

(57) ABSTRACT

A communication operating method and a dual standby mobile terminal including a first communication module and a second communication module are provided. The first communication module supports forming a first communication channel with a first wireless communication network. A second communication module supports forming a second communication channel with a second wireless communication network. When the first communication module transitions from an abnormal service state to a normal service state, the first communication module performs a base station search based on base station channel information of the second communication module and camps on a found base station.

18 Claims, 4 Drawing Sheets

COMMUNICATION OPERATING METHOD FOR DUAL STANDBY MOBILE TERMINAL AND DUAL STANDBY MOBILE TERMINAL SUPPORTING THE SAME

PRIORITY

This application claims the benefit under 35 U.S.C. §119(a) of a Korean patent application filed on Dec. 10, 2010 in the Korean Intellectual Property Office and assigned Serial No. 10-2010-0126141, the entire disclosure of which is hereby incorporated by reference.

BACKGROUND OF THE INVENTION

1. Field of the Invention

The present invention relates to a dual standby mobile terminal. More particularly, the present invention relates to a communication operating method of a dual standby mobile terminal capable of efficiently performing a maintenance and recovery process of a communication service of a mobile terminal that supports a dual standby mode and a dual standby mobile terminal supporting the same.

2. Description of the Related Art

A typical mobile terminal provides various functions. Recently, a dual mode mobile terminal capable of performing communication using any of at least two wireless communication networks is introduced. When one of the wireless communication networks is selected by a user, the dual mode mobile terminal can perform communication by accessing the selected wireless communication network. However, switching modes to access another of the at least two wireless communication networks in the dual mode mobile terminal is not easy.

Accordingly, a dual standby mobile terminal that can simultaneously access at least two wireless networks is proposed. The dual standby mobile terminal has at least two communication modules to connect to the at least two wireless communication networks at the same time. In addition, the dual standby mobile terminal can perform a call mode through at least one of the communication modules. In other words, the dual standby mobile terminal can allow easy switching between modes for using wireless communication networks.

However, when the dual standby mobile terminal performs the call mode by using one of the communication modules, a state of another communication module can be changed. This phenomenon is caused due to concentrated power supply to a particular communication module that operates the call mode or due to frequency interference created by operating the call mode. When the state of the communication module is changed, a procedure of various steps needs to be performed to restore the communication module to its original state. Such a procedure is undesirable but is needed to restore the communication module having a state that has been changed by another communication module that is activated. Here, performing a corresponding procedure causes unnecessary power consumption as well as unnecessary overload.

Meanwhile, the communication module having a service state that is changed performs an operation for supporting a service that corresponds to a normal service state. During this process, the communication module operates to recover to the normal service state according to a preset communication algorithm. Here, the communication module is required to handle a process of many steps to execute the preset communication algorithm, and therefore, a quick recovery to the normal service state is difficult to achieve. In addition, in a terminal of the related art, recovery to the normal service state requires excessive power consumption.

Therefore, a need exists for a communication operating method of a dual standby mobile terminal, in which a quick and easy recovery to a normal service state can be achieved when at least one communication module of the dual standby mobile terminal transitions to an abnormal service state and recovers to the normal service state, and a dual standby mobile terminal supporting the same.

SUMMARY OF THE INVENTION

Aspects of the present invention are to address at least the above-mentioned problems and/or disadvantages and to provide at least the advantages described below. Accordingly, an aspect of the present invention is to provide a communication operating method of a dual standby mobile terminal, in which a quick and easy recovery to a normal service state can be achieved when at least one communication module of the dual standby mobile terminal transitions to an abnormal service state and then recovers to the normal service state, and a dual standby mobile terminal supporting the same.

Another aspect of the present invention also provides a communication operating method of a dual standby mobile terminal, in which unnecessary state transitions can be prevented to reduce power consumption, and a dual standby mobile terminal supporting the same.

In accordance with an aspect of the present invention, a dual standby mobile terminal is provided. The terminal includes a first communication module for supporting a communication channel with a first wireless communication network, and a second communication module for supporting a communication channel with a second wireless communication network, wherein, when the first communication module transitions from an abnormal service state to a normal service state, the first communication module performs a base station search based on base station channel information of the second communication module and camps on a found base station.

In accordance with another aspect of the present invention, a communication operating method of a dual standby mobile terminal including a first communication module and a second communication module is provided. The method includes determining, by the first communication module, whether the second communication module is in an active state, when the first communication module attempts to form a communication channel with a first wireless communication network, sharing, by the first communication module, base station channel information of the second communication module, when the second communication module is in the active state, and performing, by the first communication module, a base station search based on the base station channel information of the second communication module to camp on a found base station.

In accordance with another aspect of the present invention, a communication operating method of a dual standby mobile terminal including a first communication module and a second communication module is provided. The method includes performing, by the first communication module, the base station search and a camping-on process based on preset frequency information, when the second communication module is in an inactive state.

In accordance with another aspect of the present invention, a communication operating method of a dual standby mobile terminal including a first communication module and a second communication module is provided. The method includes determining, by the second communication module, whether the first communication module is in the active state, when the second communication module attempts to form a communication channel with a second wireless communication network, sharing, by the second communication module, base station channel information of the first communication module, when the first communication module is in the active state, and performing, by the second communication module, the base station search based on the base station channel information of the first communication module to camp on the found base station.

In accordance with another aspect of the present invention, a communication operating method of a dual standby mobile terminal including a first communication module and a second communication module is provided. The method includes performing, by the second communication module, the base station search and a camping-on process based on preset frequency information, when the first communication module is in an inactive state.

In accordance with another aspect of the present invention, a communication operating method of a dual standby mobile terminal including a first communication module and a second communication module is provided. The method includes transitioning a service state of the first communication module when the second communication module transitions to an active state, sharing, by the first communication module, base station channel information of the second communication module, and performing, by the first communication module, a base station search based on the base station channel information of the second communication module to camp on a found base station.

In a communication operating method of a dual standby mobile terminal and a dual standby mobile terminal supporting the same, communication modules that support a dual standby mode can quickly and easily recover to a normal service state and power consumption can be reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
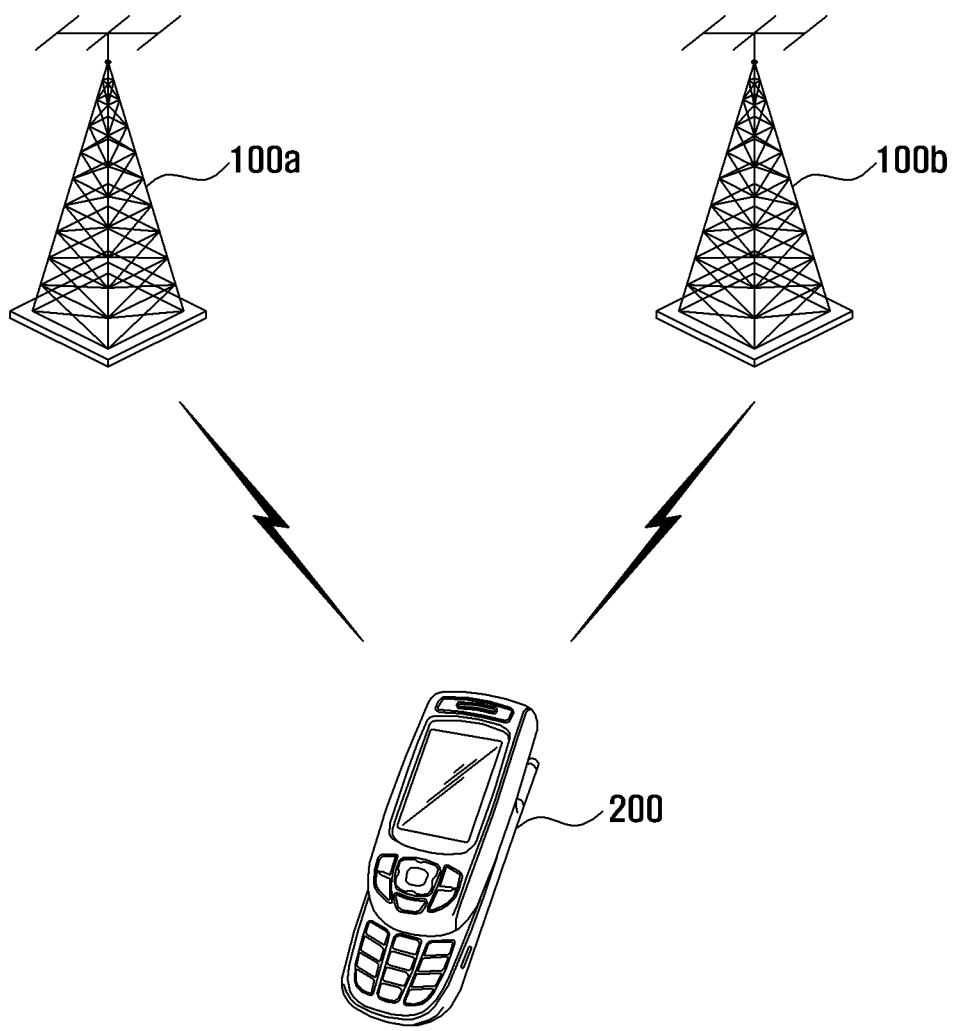
FIG. 1 is a schematic diagram illustrating a configuration of a communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention proposed herein relate to a communication operating method of a dual standby mobile terminal, in which a quick and easy recovery to a normal service state can be achieved when at least one communication module of the dual standby mobile terminal transitions to an abnormal service state and recovers to the normal service state, and a dual standby mobile terminal supporting the same.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a schematic diagram illustrating a configuration of a communication system according to an exemplary embodiment of the present invention.

Referring to FIG. 1, a communication system 100 may include a first base station 100a, a second base station 100b, and a mobile terminal 200. Additionally, the communication system 100 can further include a base station controller (not shown) that supports the base stations 100a and 100b and a mobile switching center (not shown) that is connected to the base station controller to support switching to a call mode.

The first base station 100a supports a first wireless communication network, and the second base station 100b supports a second wireless communication network. The mobile terminal 200, according to a user's request, can simultaneously connect to the first wireless communication network and the second wireless communication network through the first base station 100a and the second base station 100b.

The mobile terminal 200 periodically receives a signal from the first base station 100a and the second base station 100b in a standby mode. Here, the mobile terminal 200 can receive signals having identical or different receiving frequencies through the first and the second base stations 100a and 100b. In addition, the mobile terminal 200 can perform the call mode through one of the first base station 100a and the second base station 100b. Namely, in the call mode, the mobile terminal 200 transmits and receives signals to/from one of the first and second base stations 100a and 100b. For example, when performing the call mode through the first base station 100a, the mobile terminal 200 performs the standby mode through the second base station 100b.

Meanwhile, the mobile terminal 200 can receive base station channel information, for example, Broadcasting CHannel (BCH) information from the first base station 100a and the second base station 100b, respectively. In addition, when operating in the call mode, the mobile terminal 200 can use a Traffic CHannel (TCH) allocated by the first base station 100a and the second base station 100b. More particularly, the mobile terminal 200 supports mutual sharing of the BCH information received from the first base station 100a and the second base station 100b so that communication modules, each of which is connected to each base station for operation, can quickly and easily return to a normal service state. An exemplary configuration of the mobile terminal 200 is described with reference to FIG. 2.

Figure 2:
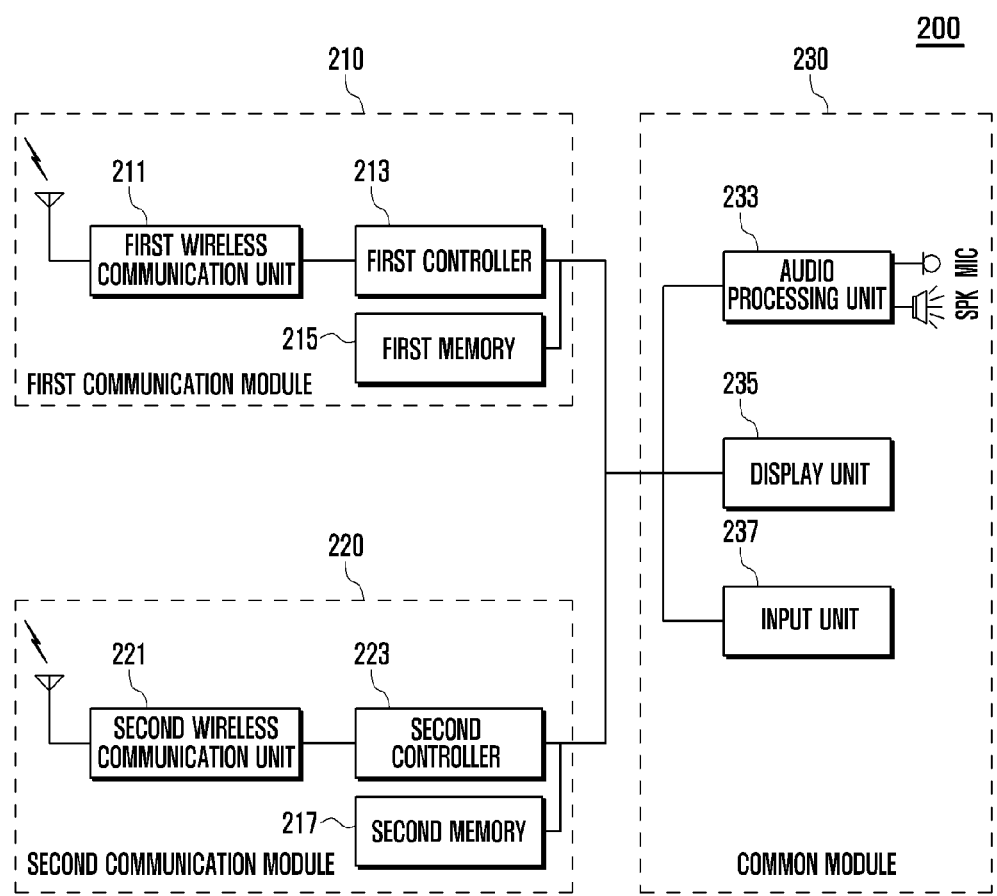
FIG. 2 is a block diagram illustrating a configuration of a dual standby mobile terminal according to an exemplary embodiment of the present invention.

FIG. 2 is a block diagram illustrating a configuration of a dual standby mobile terminal according to an exemplary embodiment of the present invention.

Referring to FIG. 2, the mobile terminal 200 may include a first communication module 210, a second communication module 220, and a common module 230.

In a case in which a service state of the first communication module 210 or the second communication module 220 is changed and returns to the normal service state, the mobile terminal 200 having the above described configuration can support a preferential base station search based on the base station channel information provided from the other communication module. Hereinafter, each element and function of the mobile terminal 200 will be described below.

The first communication module 210 is a communication module used to form a communication channel between the mobile terminal 200 and the first base station 100a to enable a communication service. In other words, the first communication module 210 can connect to a first wireless network through the first base station 100a. The first communication module 210 includes a first wireless communication unit 211, a first controller 213, and a first memory 215.

The first wireless communication unit 211 transmits a signal at a transmission frequency in accordance with the wireless communication protocol of the first wireless network and selectively receives a signal in accordance with the wireless communication protocol of the first wireless network. The first wireless communication unit 211 includes a Radio Frequency (RF) transmitter that performs a frequency up conversion and amplification on a transmission signal and an RF receiver that performs low noise amplification and a frequency down conversion on a received signal.

The first controller 213 controls an overall operation of the first communication module 210. The first controller 213 includes a data processing unit having a transmitter for encoding and modulating the transmission signal and a receiver for decoding and demodulating the received signal. Here, the data processing unit can include a modem and a codec. Further, the codec can include a data codec for processing packet data and an audio codec for processing an audio signal, such as a voice. The first controller 213 performs the standby mode when connected to the first wireless communication network through the first wireless communication unit 211. Here, the first controller 213 processes a signal periodically received from the first base station 100a. In addition, the first controller 213 performs a communication mode when a communication event occurs in the standby mode. Here, the first controller 213 can perform the communication mode at the transmission frequency in accordance with the wireless communication protocol of the first wireless communication network.

More particularly, the first controller 213 can temporarily store the BCH information received from the first wireless communication network based on the first wireless communication unit 211. In addition, when the communication service state based on the first wireless communication unit 211 transitions from the normal service state to an abnormal service state, for example, a "No Service" state and attempts to return to the normal service state, the first controller 213 can request the BCH information stored in the second communication module 220. When the BCH information stored in the second communication module 220 is received, the first controller 213 can search a neighboring base station based on the received BCH information and form a communication channel with a found base station, e.g., the first base station 100a. When the second communication module 220 is operated in the communication mode, it is probable that the first communication module 210 transitions to the "No Service" state, i.e., the abnormal service state, in a communication environment of a weak electric field. When the first communication module 210 transitions to the abnormal service state, the first controller 213 performs to return to the normal service state in order to maintain a dual standby mode. Here, the first controller 213 searches for a neighboring base station based on the first wireless communication unit 211. During the process, the first controller 213 can share the BCH information stored in the second communication module 220 and search for the neighboring base station based on the shared BCH information. Accordingly, when the first communication module 210 returns to the normal service state from the abnormal service state, the first communication module 210 performs the base station search based on the preferential BCH information provided by the second communication module 220, instead of sending/receiving a signal for transitioning to a camping state to/from each base station. Thus, the base station search can be performed faster. Even when the first wireless communication unit 211 and a second wireless communication unit 221 use different base stations, it is highly probable that the BCH information transmitted from the first base station 100a and BCH information transmitted from the second base station 100b located in a proximate area is the same or similar in part to each other. Thus, compared to a communication operation process of the related art in which various base stations are searched according to a pre-stored communication algorithm while camping on a found base station, the first communication module 210 can shorten a time required to perform the base station search by using base station information included in the BCH information of the second communication module 220, thereby enabling a quick recovery to the normal service state. Meanwhile, when the second communication module 220 is also in the unusual service state or an inactive state, the first controller 213 can communicate, e.g., form a communication channel based on the pre-stored communication algorithm, e.g., preset frequency information search algorithm.

The first memory 215 can include a program area and a data area. The program area is used to store a program for controlling a general operation of the mobile terminal 200, such as an operating system, a file reproducing program, a file search program, or a web access program. More particularly, the program area can include a first communication support program for operating the first communication module 210.

The first communication support program can be loaded on the first controller 213 to operate the first wireless communication unit 211. In addition, the first communication support program supports performing the base station search according to a pre-defined algorithm and camping on the found base station. When a call connection request message is subsequently received, the first communication support program can support a call feature. In addition, according to a user request, the first communication support program can support a communication service, such as data communication through the first base station 100a. More particularly, when the first communication module 210 transitions from the normal service state to the abnormal service state and returns to the normal service state, the first communication support program can request and receive the BCH information from the second communication module 220 and control base station searching and camping based on the received BCH information. In addition, when the base station search based on the BCH information shared by the second communication module 220 fails, the first communication support program can perform the base station search according to a preset communication algorithm.

The data area is used to store data generated during execution of the above-described program including, for example, contents, a phone book, or user input data. In addition, the data area can be used to store the BCH information received by each communication module. However, in substance, the BCH information can be stored in a temporary storage area of each controller, and thus, a separate memory area may not be needed to store the BCH information.

The second communication module 220 of the mobile terminal 200 communicates with the second base station 100b. In other words, the second communication module 220 can connect to the second wireless communication network through the second base station 100b. The second communication module 220 includes the second wireless communication unit 221, a second controller 223, and a second memory 217. When the mobile terminal 200 attempts to maintain the dual standby mode while the second wireless communication unit 221 transitions to the abnormal service state, the second controller 223 shares the BCH information stored in the first communication module 210 and performs the base station search and a camping process based on the shared BCH information.

For example, it is assumed that the first wireless communication unit 211 forms a communication channel with the first base station 100a that supports $2^{nd}$ Generation (2G) Global System for Mobile communications (GSM) and the second wireless communication unit 221 forms a communication channel with the second base station 100b that supports 2G GSM. In this case, the BCH information transmitted from the first base station 100a and BCH information transmitted from the second base station 100b may have significant portions that are substantially similar to each other. Meanwhile, the first wireless communication unit 211 can form a communication channel with the first base station 100a to receive first BCH information from the first base station 100a. The first controller 213 can temporarily store the first BCH information received from the first base station 100a. In addition, the second wireless communication unit 221 can form a communication channel with the base station 100b to receive second BCH information from the second base station 100b. The second controller 223 can temporarily store the second BCH information received from the second base station 100b. As described above, the first communication module 210 and the second communication module 220 form communication channels with the first base station 100a and the second base station 100b, respectively, and maintain a camping-on state to support the dual standby mode. In addition, in the mobile terminal 200, when one of the first communication module 210 and the second communication module 220 transitions from the normal service state to the abnormal service state and attempts to return to the normal service state, the BCH information is mutually shared and the base station search and the camping-on step are performed based on the shared BCH information. As described above, the mobile terminal 200 can support a prompt recovery to the normal service state. Similar to the first controller 213, when the first communication module 210 is in an inactive state or the abnormal service state during a process of recovering from the abnormal service state to the normal service state, the second controller 223 can support performing a process of recovering the normal service state by using a communication algorithm based on preset frequency information.

The second memory 217 can store a second communication support program for supporting the second communication module 220. The second communication support program can be loaded on the second controller 223 for operating the second wireless communication unit 221. The second communication support program can be loaded on the second controller 223 at a time point when the first communication support program is loaded on the first controller 213 to support the dual standby mode. The second communication support program can search and camp on the second base station 110b based on the second communication module 220 and can support a subsequent call service and a data communication service. More particularly, similar to the first communication support program, when recovering from the abnormal service state to the normal service state, the second communication support program shares the BCH information stored in the first communication module 210 and performs the base station search and camping based on the shared BCH information.

Meanwhile, in order for the first controller 213 and the second controller 223 to share the BCH information therebetween, the first controller 213 and the second controller 223 can provide a signal line and a port for performing an Inter-Process Communication (IPC) communication.

The common module 230 is connected to the first and the second communication modules 210 and 220 and performs various functions under the control of one of the first and the second controllers, 213 and 223, respectively. The common module 230 includes an audio processing unit 233, a display unit 235, and an input unit 237.

The audio processing unit 233 can reproduce a received audio signal outputted from the audio codec of the first controller 213 or the second controller 223 through a speaker (SPK) or transmit a transmission audio signal generated from a microphone (MIC) to the audio codec of the first controller 213 or the second controller 223. In addition, when the first communication module 210 transitions from the normal service state to the abnormal service state, or vice versa, the audio processing unit 233 can output an alarm signal notifying of this event. In addition, the audio processing unit 233 can output the notification alarm signal according to a change in service state of the second communication module 220. The output of the alarm signal can be omitted depending on a user setting.

The display unit 235 displays a user data outputted from the first controller 213 or the second controller 223. The display unit 235 can be implemented using a Liquid Crystal Display (LCD). In this case, the display unit 235 can include, for example, an LCD controller, a memory for storing image data, and an LCD display device. In addition, when the LCD is implemented as a touch screen, the display unit 235 can further serve as the input unit. In addition, the display unit 235 can be implemented by using other display device, such as a flat panel display device, including Organic Light Emitting Diodes (OLEDs). More particularly, the display unit 235 can output an indicator or a certain message regarding the dual standby mode of the mobile terminal 200. Namely, the display device 235 can output an indicator, an icon or a pop-up message regarding the service state of the first communication module 210 and the service state of the second communication module 220. In addition, the display unit 235 can output a message corresponding to a change in the service state of the first communication module 210 and the second communication module 220.

The input unit 237 receives numeral or character information and includes a plurality of input keys and function keys for setting up various features. The function keys may include, for example, an arrow key, a side key, and a shortcut key that are assigned to perform a particular function. In addition, the input unit 237 generates an input key signal related to a user setting and function control of the mobile terminal 200 and transmits the input key signal to the controller 160. More particularly, the input unit 237 can generate, for example, an input signal for entering into the dual standby mode or an input signal for activating a particular communication module according to user control. In addition, the input unit 237 can transmit the generated input signal to the controller 160. Here, the mobile terminal 200, in a default mode, can proceed to enter into the dual standby mode without generating a separate input signal.

As described above, when each communication module attempts to recover from the abnormal service state to the normal service state, the dual standby mobile terminal 200 can support a communication operation in which the base station search can be performed based on the BCH information stored in other communication modules. Thus, the dual standby mobile terminal 200 can support a faster recovery to the normal service state while minimizing power consumption required therefor.

An exemplary role and function of each element for communication operation in a dual standby mobile terminal are described above. Hereinafter, an exemplary signal flow and communication operation method in a dual standby mobile terminal are described with reference to accompanying drawings.

Figure 3:
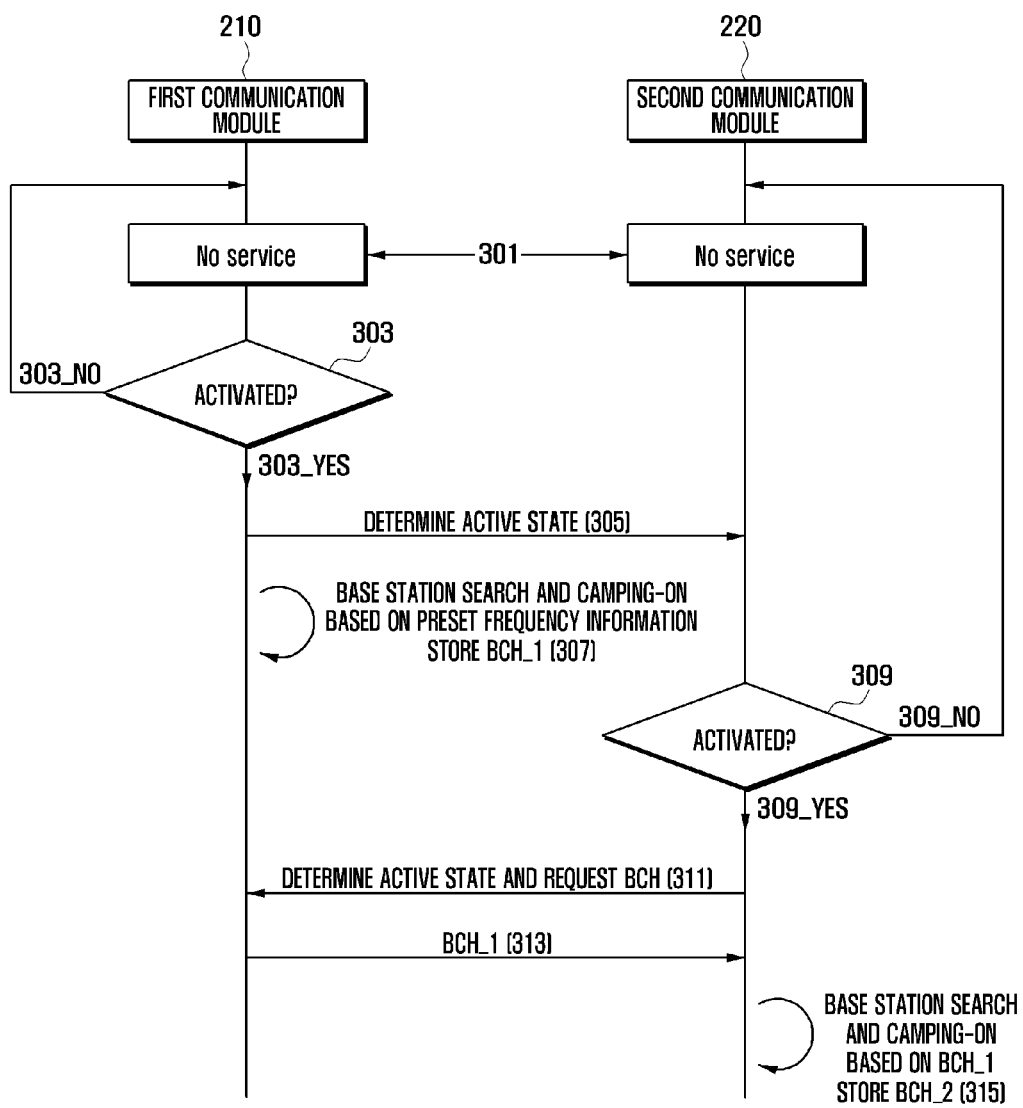
FIG. 3 is an explanatory view illustrating signal transmission/receipt in a communication operation of a dual standby mobile terminal according to an exemplary embodiment of the present invention.

FIG. 3 illustrates a signal flow in a communication operation procedure of a mobile terminal according to an exemplary embodiment of the present invention.

Referring to FIG. 3, in the communication operation procedure of the mobile terminal 200, the first communication module 210 and the second communication module 220 can be in the "No Service" state, prior to operating a service at step 301.

The first communication module 210 can determine whether an event for activating the first communication module 210 occurs at step 303. If it is determined that the event for activating the first communication module 210 does not occur at step 303, the first communication module 210 can return to step 301 (see an arrow labeled as '303_No' flowing from step 303). In contrast, if it is determined that the event for activating the first communication module 210 occurs at step 303, e.g., schedule information for activating the first communication module 210 is received or the input signal is generated, the first communication module 210 can perform a procedure for activation thereof (see an arrow labeled as '303_Yes' flowing from step 303).

Here, the first communication module 210 can determine whether the second communication module 220 is in an active state at step 305. In addition, when the second communication module 220 is in an inactive state, the first communication module 210 performs the base station search based on the preset frequency information while camping on the found base station at step 307. Further, the first communication module 210 can store BCH_1 information received from a corresponding base station during the camping-on process.

Meanwhile, the second communication module 220 can determine whether an event for activating the second communication module 220 occurs at step 309. If it is determined that the event for activating the second communication module 220 does not occur, the second communication module 220 can branch to step 301 to return to the "No Service" state (see an arrow labeled as '309_No' flowing from step 309). In contrast, if it is determined that the event for activating the second communication module 220 occurs at step 309, e.g., schedule information for activating the second communication module 220 is received or the input signal is generated, the second communication module 220 can perform a procedure for activation thereof (see an arrow labeled as '309_Yes' flowing from step 309). Here, the second communication module 220 can identify whether the first communication module 210 is in the active state while requesting the BCH_1 information if the first communication module 210 is in the active state at step 311. In this case, the second communication module 220 can directly request the BCH_1 information to the first communication controller 213 by using, for example, the IPC communication.

When the first communication module 210 transmits the BCH_1 information at step 313, the second communication module 220 performs the base station search based on the BCH_1 information transmitted from the first communication module 210 and performs the camping-on process on the found base station at step 315. In this process, the second communication module 220 can store BCH_2 information received from the found base station.

Consequently, when the first communication module 210 transitions from the normal service state to the abnormal service state and attempts to return to the normal service state, the first communication module 210 requests the BCH_2 information to the second communication module 220. When the second communication module 220 provides the BCH_2 information, the first communication module 210 can perform the base station search and the camping on process based on corresponding BCH_2 information. Similarly, when the second communication module 220 transitions from the normal service state to the abnormal service state and attempts to return to the normal service state, the second communication module 220 can support performing steps 311, 313 and 315, repeatedly.

When the base station search and the camping on process performed based on the BCH information received from the other communication module fails, the first communication module 210 or the second communication module 220 can perform the base station search and the camping on process based on the preset frequency information.

Figure 4:
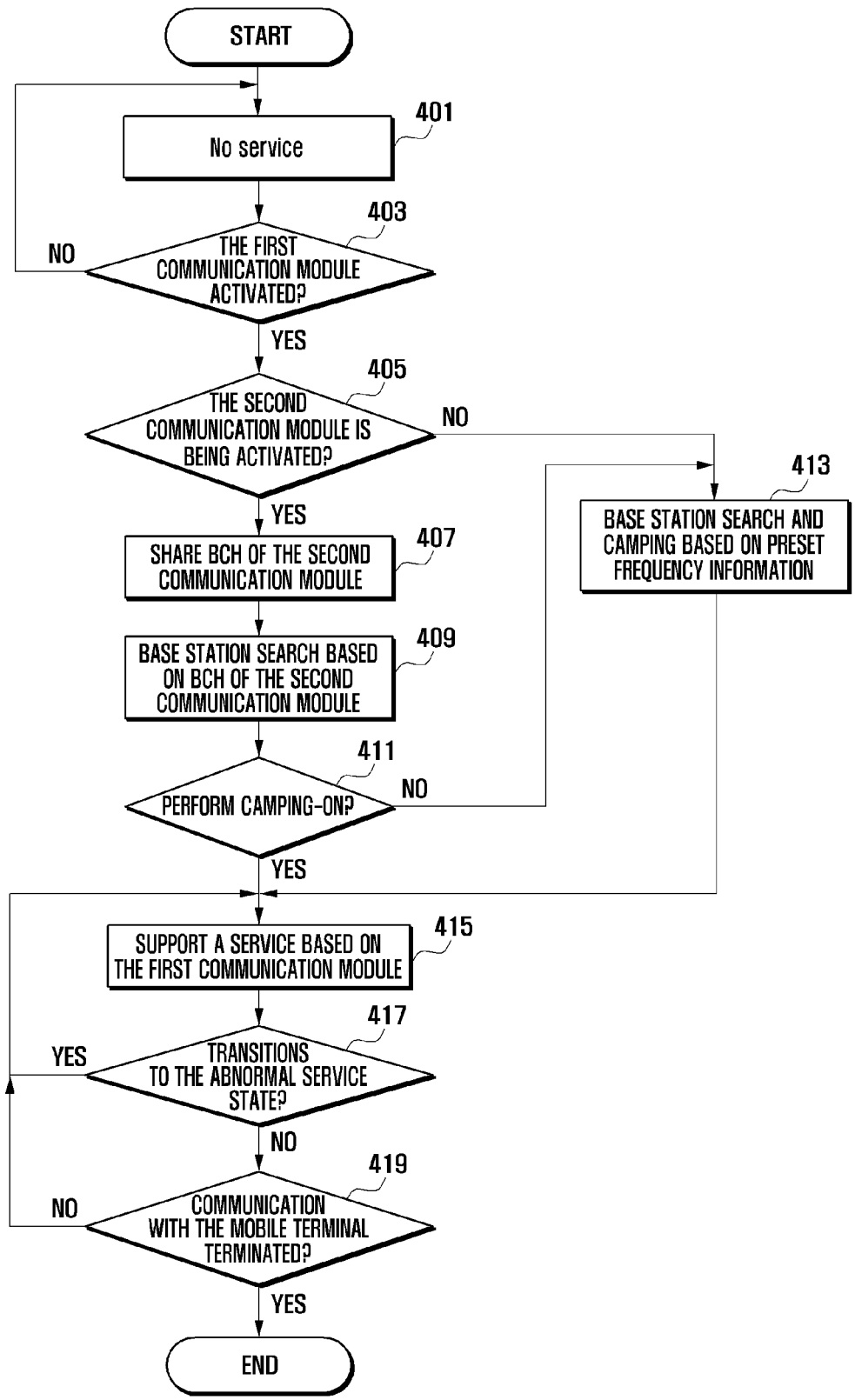
FIG. 4 is a flowchart illustrating a communication operating method in a particular communication module of a mobile terminal according to an exemplary embodiment of the present invention.

FIG. 4 is a flowchart illustrating a communication operating method in a particular communication module of a mobile terminal according to an exemplary embodiment of the present invention Referring to FIG. 4, in the communication operating method of the dual standby mobile terminal 200, the first communication module 210 can be in the "No Service" state according to the inactive state or abnormal service state at step 401.

Thereafter, the mobile terminal 200 can determine whether the input signal or the schedule information is generated to activate the first communication module 210 at step 403. The first communication module 210 can generate an event for continuously maintaining the normal service state so that the mobile terminal 200 can maintain the dual standby mode. In other words, even in a case where no separate input signal is generated, the mobile terminal 200 can control the first communication module 210 to be activated to maintain the normal service state. However, depending on a user setting or a user request, the first communication module 210 can maintain the inactive state. In this case, the first communication module 210 can branch to step 401 to transition to the "No Service" state.

Meanwhile, when the event for activating the first communication module 210 is generated, for example, the schedule information occurs at step 403, the mobile terminal 200 can determine whether the second communication module 220 maintains the active state at step 405. Namely, it is determined whether the second communication module 220 is in the normal service state. Here, when the second communication module 220 is in the active state, the mobile terminal 200 can share the BCH information of the second communication module 220 at step 407. In other words, the first communication module 210 of the mobile terminal 200 can request the BCH information stored in the second communication module 220 and receive the BCH information from the second communication module 220.

Thereafter, the first communication module 210 of the mobile terminal 200 can perform the base station search based on the BCH information received from the second communication module 220 at step 409. In addition, when the base station search is performed normally, the first communication module 210 can support signal transmission/receipt to camp on a corresponding base station.

Thereafter, the first communication module 210 determines whether the camping on process is performed successfully at step 411, and if the camping on process is performed successfully, the first communication module 210 can support a communication service based on the first communication module 210 at step 415. Thereafter, the mobile terminal 200 determines whether the first communication module 210 transitions to the abnormal service state at step 417. If the first communication module 210 transitions to the abnormal service state, the mobile terminal 200 can proceed to step 415 to repeat subsequent steps described above. In contrast, if the first communication module 210 does not transition to the abnormal service state at step 417, the first communication module 210 can determine whether communication with the mobile terminal 200 is terminated at step 419. When a separate input signal for terminating the communication with the mobile terminal 200 is not generated, the first communication module 210 can continuously maintain at step 415.

Meanwhile, when the second communication module 220 is in the inactive state or abnormal service state at step 405, the first communication service module 210 can perform the base station search based on the preset frequency information while supporting to camp on the found base station at step 413.

The above description discusses operation of the first communication module 210 only. However, it should be noted that the same procedure described above can apply to operation of the communication module 220.

As described above, in an exemplary communication operating method of a dual standby mobile terminal, information for a base station search provided from the communication module in the normal service state can be shared by the communication module in the abnormal service state so that the base station search can be performed using the shared base station channel information, i.e., BCH information. Thus, according to the communication operating method of the dual standby mobile terminal, the communication module in the abnormal service state can quickly transition to the normal service state.

Meanwhile, in the above description, it is described that the first communication module 210 or the second communication module 220 performs the base station search based on the BCH information of the other communication module. However, it should be noted that the present invention is not limited to this exemplary implementation. In other words, for example, when the first communication module 210 operates as a master communication module and the second communication module 220 operates as a slave communication module, only the BCH information of the first communication module 210 can be shared by the second communication module 220, which is in operation, to perform the base station search. The first communication module 210 can perform the base station search based on the preset frequency information and perform the camping-on process based on the found base station.

In addition, in contrast to the above exemplary implementation (i.e., when the second communication module 220 operates as the master communication module and the first communication module 210 operates as the slave communication module), the second communication module 220 can perform the base station search based on the preset frequency information and perform the camping-on process based on the found base station. The first communication module 210, which is in operation, can share the BCH information stored in the second communication module 220 to perform the base station search and the camping-on process, if the second communication module 220 is in the active state. Thus, in the mobile terminal 200, at least one of the first communication module 210 and the second communication module 220 performs the base station search and the camping-on process based on the BCH information stored in the other communication module.

Meanwhile, the mobile terminal 200 described above may further include other elements to achieve additional functions. For example, a short-range communication module for performing short-range communication, a camera module for capturing still images/video of a subject, an interface for data transmission/reception via wired or wireless communication of the mobile terminal 200, an Internet communication module for providing internet services by communicating with an Internet network, and a digital broadcast module for receiving and reproducing digital broadcast data. With the convergence of digital devices, there may be many digital devices and modifications thereof, not listed in the application, and, it will be appreciated that such devices and modifications thereof can also be included in the mobile terminal 200. In addition, a person of ordinary skill in the art will appreciate that the mobile terminal 200 may be implemented by omitting a particular element or replacing a particular element with other elements.

Furthermore, the mobile terminal 200 may provide any type of device that supports the dual standby mode. For example, the mobile terminal 200 may include all information technology devices and multimedia devices as well as their associated application devices, including, for example, a Portable Multimedia Player (PMP), a digital broadcasting player, Personal Digital Assistant (PDA), a music reproducing device (e.g., a Motion Pictures Expert Group (MPEG-1 or MPEG-2) Audio Layer-3 (MP3) player), a mobile game terminal, a smart phone, a laptop computer, and a handheld Personal Computer (PC) as well as all mobile communication terminals operating based on communication protocols corresponding to various communication systems.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A dual standby mobile terminal comprising:
   a first communication module configured to support a communication channel with a first wireless communication network; and
   a second communication module configured to support a communication channel with a second wireless communication network, wherein, when the first communication module transitions from an abnormal service state to a normal service state, the first communication module performs a base station search based on base station channel information of the second communication module and camps on a found base station.

2. The terminal according to claim 1, wherein the first communication module comprises:
   a first wireless communication unit configured to support the communication channel with the first wireless communication network; and
   a first controller configured to control the first wireless communication unit and configured to receive the base station channel information from the second communication module to perform the base station search and camp on the found base station so as to transition from the abnormal service state to the normal service state.

3. The terminal according to claim 2, wherein the first controller is configured to perform the base station search based on preset frequency information and configured to camp on the found base station, when the second communication module is in an inactive state or the abnormal service state.

4. The terminal according to claim 1, wherein the second communication module comprises:
   a second wireless communication unit configured to form the communication channel with the second wireless communication network; and
   a second controller configured to control the second wireless communication unit to control transmission/reception of data required to form the communication channel with the second wireless communication network.

5. The terminal according to claim 4, wherein the second controller is configured to share the base station channel information stored in the first communication module to perform the base station search and a camping-on process based on the base station channel information stored in the first communication module, when the second wireless communication unit transitions from the abnormal service state to the normal service state.

6. The terminal according to claim 5, wherein the second controller is configured to perform the base station search based on preset frequency information and configured to camp on the found base station, when the first communication module is in an inactive state or the abnormal service state.

7. The terminal according to claim 1, wherein the base station channel information is Broadcasting CHannel (BCH) information.

8. The terminal according to claim 1, further comprising:
   a display unit configured to output a service state of the first communication module or a service state of the second communication module.

9. A communication operating method of a dual standby mobile terminal including a first communication module and a second communication module, the method comprising:
   determining, by the first communication module, whether the second communication module is in an active state, when the first communication module attempts to form a communication channel with a first wireless communication network;
   sharing, by the first communication module, base station channel information of the second communication module, when the second communication module is in the active state; and
   performing, by the first communication module, a base station search based on the base station channel information of the second communication module to camp on a found base station.

10. The method according to claim 9, further comprising:
    performing, by the first communication module, the base station search and a camping-on process based on preset frequency information, when the second communication module is in an inactive state.

11. The method according to claim 9, further comprising:
    determining, by the second communication module, whether the first communication module is in the active state, when the second communication module attempts to form a communication channel with a second wireless communication network;
    sharing, by the second communication module, base station channel information of the first communication module, when the first communication module is in the active state; and
    performing, by the second communication module, the base station search based on the base station channel information of the first communication module to camp on the found base station.

12. The method according to claim 11, further comprising:
    performing, by the second communication module, the base station search and a camping-on process based on preset frequency information, when the first communication module is in an inactive state.

13. The method according to claim 9, wherein the base station channel information is Broadcasting CHannel (BCH) information.

14. The method according to claim 9, further comprising:
    outputting a service state of the first communication module or a service state of the second communication module.

15. A communication operating method of a dual standby mobile terminal including a first communication module and a second communication module, the method comprising:

transitioning a service state of the first communication module when the second communication module transitions to an active state;

sharing, by the first communication module, base station channel information of the second communication module; and performing, by the first communication module, a base station search based on the base station channel information of the second communication module to camp on a found base station.

16. The method according to claim 15, further comprising:
performing, by the first communication module, the base station search and a camping-on process based on preset frequency information, when the base station channel information is not to be shared.

17. The method according to claim 15, further comprising:
outputting a change in the service state of the first communication module or a change in a service state of the second communication module.

18. The method according to claim 15, wherein the base station channel information is Broadcasting CHannel (BCH) information.

* * * * *